Oct. 1, 1929.  W. SCHAAKE  1,729,900
GUARD FOR TROLLEY CONDUCTORS AND HANGERS
Filed March 28, 1927  2 Sheets-Sheet 1

WITNESSES:
A. T. Procter
Birney Hines

INVENTOR
William Schaake
BY
Wesley G. Carr
ATTORNEY

Oct. 1, 1929.   W. SCHAAKE   1,729,900
GUARD FOR TROLLEY CONDUCTORS AND HANGERS
Filed March 28, 1927   2 Sheets-Sheet 2

WITNESSES:
H. J. Procter
Birney Hines

INVENTOR
William Schaake
BY
Wesley S. Carr
ATTORNEY

Patented Oct. 1, 1929

1,729,900

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

GUARD FOR TROLLEY CONDUCTORS AND HANGERS

Application filed March 28, 1927. Serial No. 178,891.

My invention relates generally to overhead-trolley-conductor systems for electric railways and more particularly to guards for the conductors and hangers in such systems.

In trolley hangers of the usual type employed in overhead-trolley-conductor systems for electric railways, the lips of the hangers become worn and thereafter the trolley collector wheels wear the trolley conductor at the points where it is supported by the trolley hangers. Also, the trolley conductor is pitted by reason of the arcing that occurs between the trolley wheels and the conductor at the points where the hangers are attached to the conductor. The pitting of short sections of the trolley conductor, and the wearing of the hangers soon reduce the whole system to an unsafe condition, and comparatively large replacement costs follow.

The object of the invention, generally stated, is the provision of a guard for the conductors and hangers of overhead-trolley-conductor systems that shall be simple and efficient in operation and capable of being readily and economically manufactured.

Another object of the invention is to provide a guard that will prevent the wearing of the lips of the hanger and of the trolley conductor adjacent to the hanger.

A further object of the invention is to reduce or eliminate sparking between traveling current collectors and the hangers and conductors of an overhead-trolley-conductor system.

It is also an object of my invention to provide a guard that may be readily and easily replaced when it becomes worn.

Other objects of the invention will, in part, be obvious, and will, in part, appear hereinafter.

I have, therefore, devised a guard comprising a pair of protective runners that may be secured to the trolley hanger in such a manner that they depend on both sides of the trolley hanger or ear and protect the conductor and hanger from wear by the trolley-conductor wheels.

For a fuller understanding of the invention, reference may be had to the following detailed description, taken in connection with the accompanying drawings, in which.

Figure 1:
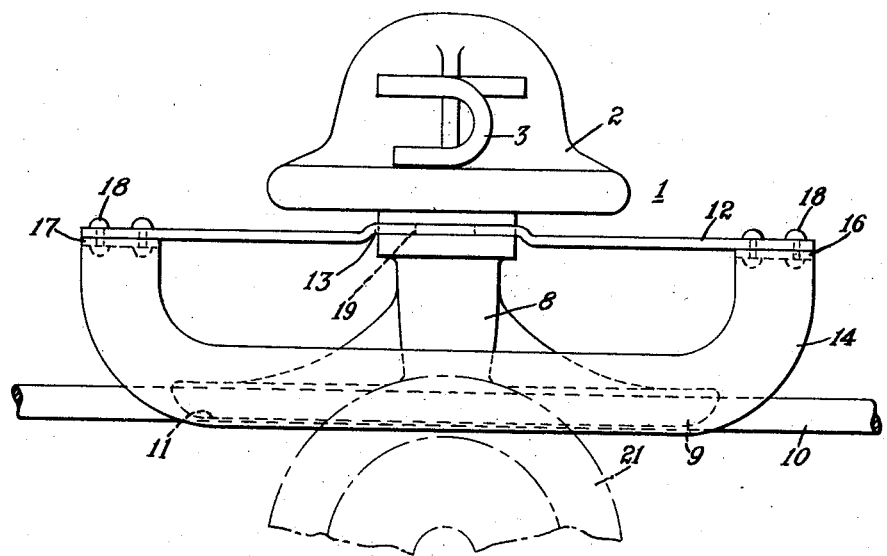
Fig. 1 is a view, in side elevation, of a guard constructed in accordance with one form of my invention.
Figure 2:
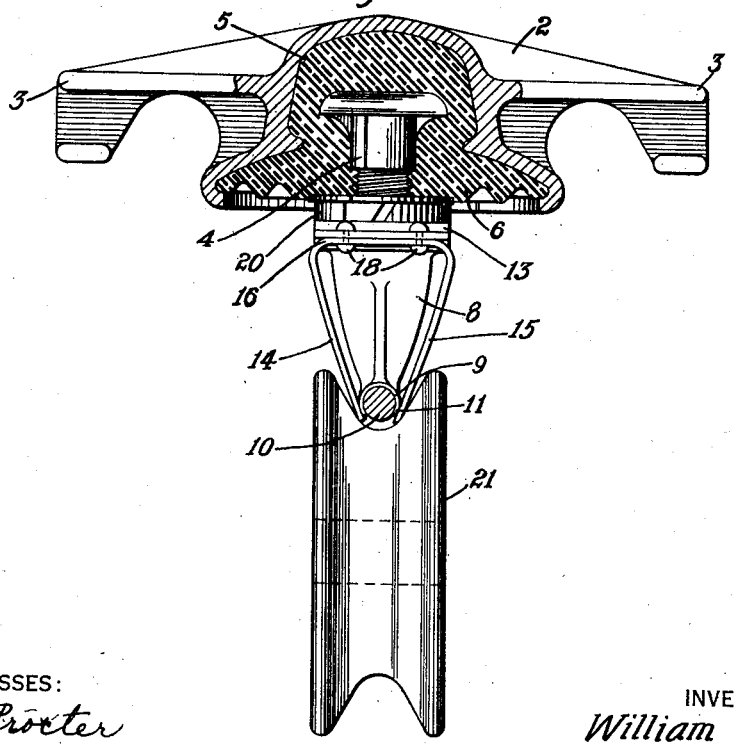
Fig. 2 is a view, partially in elevation and partly in section, of one end of the hanger and guard illustrated in Fig. 1.
Figure 3:
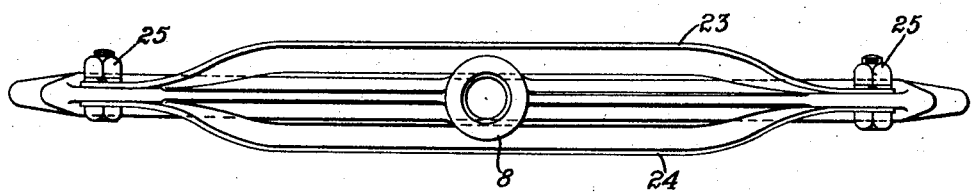
Fig. 3 is a top plan view of a modified form of my invention.
Figure 4:
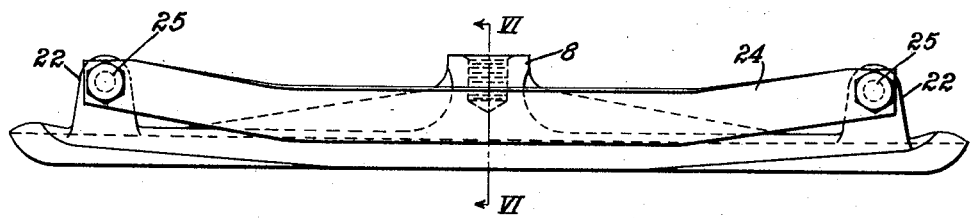
Fig. 4 is a view, in side elevation, of the device illustrated in Fig. 3.
Figure 5:
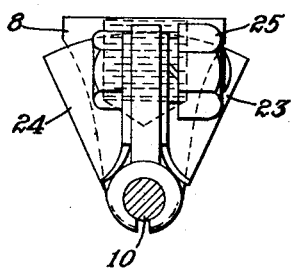
Fig. 5 is an end view of the device illustrated in Figs. 3 and 4.
Figure 6:
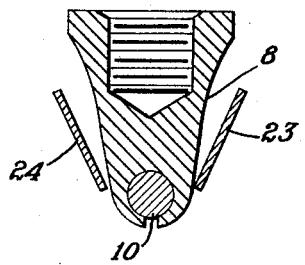
Fig. 6 is a view, in section, taken on the line VI—VI of Fig. 4.

In Figs. 1 and 2 of the drawing, is illustrated a trolley hanger 1 of a well-known type comprising an inverted hollow metal body portion 2 having transversely extending lugs 3 for attachment to a guy-wire (not shown). A screw threaded stud 4, having a head 5, is secured to the hollow metal body portion 2 by a body of molded insulating material 6.

A trolley ear 8 comprising a longitudinal inverted channel member 9 adapted to receive a trolley conductor 10, is provided with lips 11 that may be bent around the conductor 10 after the insertion of the latter in the channel portion 9 and a centrally disposed internally threaded boss for receiving the stud 4, is suspended from the body portion 2.

The guard, illustrated as mounted on the hanger, comprises an elongated body member 12 provided with an offset central portion 13 and a pair of protective runners 14 and 15, the top portions 16 and 17 of which are secured to the ends of the body member 12 by means of rivets 18, and the lower portions of which extend downwardly and inwardly on the sides of the hanger.

The guard shown in Figs. 1 and 2 may be constructed by stamping the parts from any suitable metallic sheet material, bending them into the desired form and fastening them together by any well known means, such as riveting or welding.

The body member 12 is provided with a centrally located aperture 19 in its offset portion 13, whereby the guard may be secured to the hanger by threading it upon the stud 4 when the trolley ear 8 is mounted thereon. Therefore, the guard will be held firmly between the upper portion of the trolley ear 8 and the lower portion of the trolley hanger 1. A lock washer 20 may be placed in position on the stud 4 between the hanger 1 and the trolley ear 8 to assist in locking the parts in position.

In Fig. 2, a trolley wheel 21 is illustrated in contact with the protective runners, in accordance with the position it will assume as it passes along the conductor 10 under the hanger.

In the modified form of my invention illustrated in Figs. 3, 4, 5 and 6, each end of the trolley ear 8 is provided with an upwardly extending lug 22 to which the ends of a pair of protective runners 23 and 24 are fastened by means of bolts and nuts 25. The protective runners 23 and 24 are preferably constructed of flexible sheet material, and their central portions are shaped to extend downwardly along each side of the trolley ear 8 to a position where they are adjacent to, and substantially parallel with, the trolley conductor. Therefore, the runners will act as a cushioned wearing contact for the trolley collector wheels.

When a trolley wheel passes along a trolley conductor that is supported by hangers which are provided with my improved guard, the wheel will engage the flexible or resilient protective runners instead of striking the lips of the trolley ears as it passes under the hangers, and will thereby be prevented from wearing away the lips of the trolley ears. Furthermore, inasmuch as the protective runners are constructed of metal that is a good conductor of electricity, they will act as a path for the current flowing from the trolley conductor to the trolley wheel and thus avoid any arcing and pitting at the point where the trolley conductor is suspended from the hanger.

While the illustrated examples constitute particular embodiments of my invention, I do not limit myself strictly to the details here shown, since, manifestly, the same may be considerably varied without departing from the spirit of the invention as defined in the appended claims.

I claim as my invention:

1. A guard for trolley conductors and trolley-conductor hangers comprising a body member adapted to be rigidly secured to the upper part of a trolley ear and side members secured to the body member and extending downwardly to protect the ear.

2. A guard for trolley-conductor ears comprising a body member adapted to be rigidly secured to the upper part of a trolley ear and resilient side members secured to the body member and extending downwardly to protect the ear.

3. A guard for trolley-conductor ears comprising a body member adapted to be secured to the upper part of a trolley ear and side members secured to the body member and extending downwardly and inwardly to protect the ear.

4. The combination with a trolley hanger provided with lips for gripping a trolley conductor, of a pair of protective runners having downwardly extending portions adapted to prevent the lips of the ear from being worn away by current collectors, and means for rigidly connecting the upper portions of the runners to the body of the ear.

5. The combination with a trolley hanger provided with lips for gripping a trolley conductor, of a pair of protective runners having downwardly extending portions adapted to prevent the lips of the hanger from being worn away by current collectors, and means for rigidly connecting the ends of the runners to the body of the hanger.

6. The combination with a hanger for trolley conductors comprising an insulator, a trolley conductor ear, and a threaded stud for connecting the ear to the insulator, of a guard for the ear having a body portion provided with a central aperture, whereby it may be threaded upon the stud and be held between the ear and the insulator and having side portions that depend downwardly along the sides of the ear to protect the ear.

7. The combination with a trolley conductor and a hanger therefor comprising an insulator, a trolley-conductor ear and a threaded stud for connecting the ear to the insulator, of a guard for the ear comprising an elongated body member provided with a central aperture whereby it may be threaded upon the stud and be held between the ear and the insulator, and side members attached to the body member and extending downwardly to protect the ear.

In testimony whereof, I have hereunto subscribed my name this 22nd day of March, 1927.

WILLIAM SCHAAKE.